United States Patent
Jiang et al.

(10) Patent No.: US 6,635,730 B1
(45) Date of Patent: Oct. 21, 2003

(54) POLYMERIZABLE THIOACRYLATE COMPOSITIONS AND OPTICAL LENSES WITH A HIGH REFRACTIVE INDEX OBTAINED FROM SAID COMPOSITIONS

(75) Inventors: Peiqi Jiang, Kanagawa (JP); Gilbert Menduni, Tokyo (JP); Gilles Widawski, Paris (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/481,734

(22) Filed: Jan. 11, 2000

Related U.S. Application Data

(63) Continuation of application No. PCT/FR98/01429, filed on Jul. 3, 1998.

(30) Foreign Application Priority Data

Jul. 11, 1997 (FR) .............................................. 97 08903

(51) Int. Cl.[7] ........................... C08F 220/20; G02B 1/04
(52) U.S. Cl. ....................................... 526/286; 351/159
(58) Field of Search ........................ 526/286; 351/159

(56) References Cited

U.S. PATENT DOCUMENTS

| | | | | |
|---|---|---|---|---|
| 5,502,141 A | * | 3/1996 | Iguchi | 526/286 |
| 5,741,831 A | * | 4/1998 | Keita | 513/106 |
| 6,172,140 B1 | * | 1/2001 | Toh | 523/289 |

FOREIGN PATENT DOCUMENTS

| EP | 0394495 | 10/1989 |
|---|---|---|
| WO | WO 96/26184 | 8/1996 |
| WO | WO 96/38486 | 12/1996 |

* cited by examiner

*Primary Examiner*—Christopher Henderson
(74) *Attorney, Agent, or Firm*—Fulbright & Jaworski L.L.P.

(57) ABSTRACT

The invention concerns novel polymerisable compositions and optical lenses with high refractive index obtained from said compositions, characterized in that they comprise as constituents base copolymerisable monomers at least 85 wt. % of the total weight of copolymerisable monomers present in the composition: of a mixture M, for 100 parts by weight of the mixture; of (A) 20 to 80 parts of one or several, preferably only one, non-aromatic compounds (I) comprising two thio(meth)acrylate functions, and (B) 80 to 20 parts of a compound of formula (I) in which $R_1$ and $R_2$ represent, independently of each other, H or $CH_3$ and m+n has a mean value from 0 to 20 inclusively; and 3 to 30% by weight relative to the weight of mixture M of a polythiol; the composition containing less than 5 wt. % of other aromatic thio(meth)acrylate copolymerisable, cyclanic or vinyl aromatic mono(meth)acrylate monomers. The invention is applicable to the manufacture of spectacle lenses.

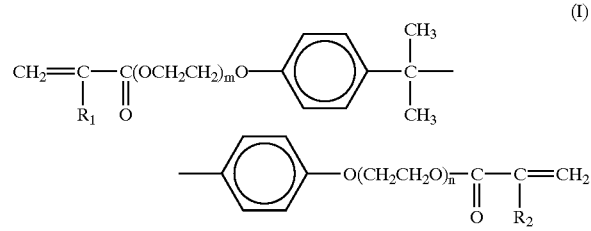

18 Claims, No Drawings

POLYMERIZABLE THIOACRYLATE COMPOSITIONS AND OPTICAL LENSES WITH A HIGH REFRACTIVE INDEX OBTAINED FROM SAID COMPOSITIONS

This application is a continuation of international application number PCT/FR98/01429 filed Jul. 3, 1998, which is a continuation of French Application No. 97/08903 filed Jul. 11, 1997.

A subject-matter of the invention is novel polymer compositions for the manufacture of optical lenses with a high refractive index and the optical lenses, in particular ophthalmic lenses, obtained from these compositions.

The term "optical lens with a high refractive index" means an optical lens with a refractive index of greater than or equal to 1.55 and preferably greater than 1.57.

The novel polymerizable compositions according to the invention are preferably of use in the manufacture of spectacle glasses.

An ophthalmic lens with a high refractive index must have all the following characteristics:
- a high transparency (transmission generally of greater than 85% and preferably of greater than or equal to 90%), with an absence of or optionally a very low light scattering,
- a high Abbe number of greater than or equal to 30 and preferably of greater than or equal to 35, in order to avoid chromatic aberrations,
- a low yellowing index and an absence of yellowing over time,
- a good impact strength (in particular according to the CEN and FDA standards),
- a good suitability for various treatments (shock-proof primer, anti-reflective or hard coating deposition, and the like) and in particular good suitability for colouring,
- a glass transition temperature value preferably of greater than or equal to 80° C. and better still of greater than 90° C., preferably of between 90 and 110° C.

In addition, the polymerizable compositions must also be easy to process industrially.

In particular, it is desirable for the compositions to be able to be photopolymerized, this being because this type of very fast polymerization makes it possible to reduce the cycle times for the manufacture of the lenses.

Another point to be taken into consideration is the number and the nature of the monomers used in the composition for the production of the organic glass.

These monomers must be readily available commercially, in large amounts, at low costs and with uniform quality.

On this latter point, monomers manufactured in industrial amounts exhibit substantially different characteristics, depending on the industrial manufacturing parameters, which can, to a certain extent, influence the properties of the final polymer and thus of the optical lens.

It is therefore desirable for the polymerizable composition to comprise a reduced number of precursor monomers. In addition, this limits the problems of storage and of logistics.

Polymerizable compositions for the production of polymers with a high refractive index are already known in the state of the art.

Patent Application EP 394,495 discloses polymerizable compositions based on 4,4'-bis-(methacryloylthio)diphenyl sulphide (denoted by BMTPS) and on another vinyl monomer copolymerizable with BMTPS and a polythiol represented by the general formula $R(SH)_n$, in which R is a polyvalent organic group and n represents an integer equal to 2 or more.

Thus, Example 27 of this document describes a polymerizable composition with three constituents comprising, as parts by weight, 5 parts of BMTPS, 4 parts of a diethoxy-bisphenol A diacrylate and 1 part of an aromatic polythiol of formula:

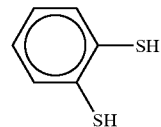

The documents JP 61-23855, JP 61-23856 and JP 61-23858 disclose the production of spectacle glasses from compositions comprising 4 to 6 monomer constituents, including, in particular, BMTPS.

Furthermore, these compositions comprise aromatic vinyl derivatives which are not suited to photopolymerization.

Patent Application EP 609,454 relates to a process for the production of sulphur-comprising polymers with a high refractive index exhibiting a decreased colouring, a high transmission power, a resistance to yellowing (during ageing of the glass) and a low relative density.

The polymerizable compositions disclosed in this document comprise from 0.1 to 7% by weight of at least one compound chosen from chain-transfer agents and compounds for scavenging free radicals.

Mono- or polyfunctional mercapto compounds are mentioned among these compounds. It is specified, in this application, that, beyond 7% by weight, the mechanical properties of the polymer deteriorate or the excess compound escapes from the polymer.

Patent Application FR 95 006443, on behalf of the Company Essilor, discloses polymerizable compositions for the manufacture of polymers with a high index comprising bis(2-methacryloylthioethyl) sulphide (denoted by BMTES) or a BMTES/BMTPS mixture with a derivative of the polyethoxybisphenol A polymethacrylate type and an aromatic or cyclanic mono(meth)acrylate monomer.

In practice, the polymerizable compositions disclosed in this patent application comprise at least 4 to 6 polymerizable monomer constituents.

Furthermore, although the polymerizable compositions disclosed in this application are satisfactory, they can still be improved, in particular with regard to the yellowing index and the behaviour towards ageing.

An object of the invention is thus to provide simple polymerizable compositions with three base monomer constituents having improved properties with regard to the prior art.

According to the invention, the polymerizable composition comprises, as base copolymerizable monomer constituents, at least 85% by weight, with respect to the total weight of the copolymerizable monomers present in the composition:
  of a mixture M consisting, per 100 parts by weight of the mixture, of:
    (A) 20 to 80 parts of one or more nonaromatic compounds (I), preferably a single nonaromatic compound (I), comprising two thio(meth)acrylate functional groups

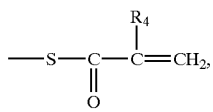

where $R_4$=H or $CH_3$, and (B) 80 to 20 parts of a compound (II), or of a mixture of these compounds, of formula:

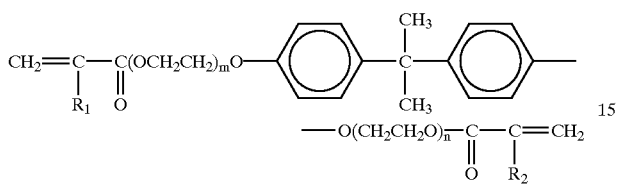

in which $R_1$ and $R_2$ represent, independently of one another, H or $CH_3$ and m+n has a mean value of 0 to 20 inclusive; and 3 to 30% by weight, with respect to the weight of the mixture M, of a polythiol, preferably 5 to 20%;

the composition comprising less than 5% by weight of other aromatic thio(meth)acrylate, aromatic or cyclanic mono(meth)acrylate and aromatic vinyl copolymerizable monomers.

The compositions according to the invention preferably comprise 90%, more preferably 95%, better still 98% and, as far as possible, 100% by weight of the base copolymerizable monomer constituents.

More preferably, the compositions according to the invention do not comprise di- and/or polyvinyl monomers. In the present application, the term "di- and polyvinyl monomers" is understood to mean monomers in which two or more $CH_2$=CH— groups are bonded directly to hydrocarbonaceous fragments of the monomers, such as, for example, di- and polyvinyl hydrocarbons, divinylbenzene and divinylnaphthalene.

The polymerizable compositions according to the invention are preferably photopolymerizable compositions.

The nonaromatic compounds (I) comprising two thio(meth)acrylate functional groups of the mixture M of the polymerizable compositions according to the invention are compounds which are known in the art.

The compound (I) preferably corresponds to the formula:

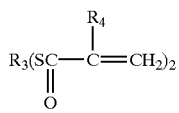

in which $R_3$ represents a linear or branched divalent aliphatic hydrocarbonaceous radical which can optionally comprise, in its chain, one or more groups chosen from the divalent groups —O—, —S— or

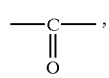

preferably —O— or —S—, and better still the divalent group —S—, and $R_4$ represents H or $CH_3$.

Mention may be made, among monomers of formula (I) recommended in the present invention, of:

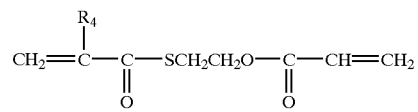

S-2-acryloyloxyethyl thio(meth)acrylate,

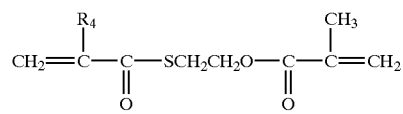

S-2-methacryloyloxyethyl thio(meth)acrylate,

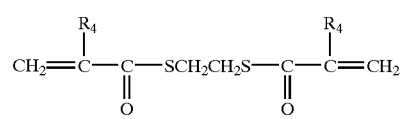

1,2-bis[(meth)acryloylthio]ethane,

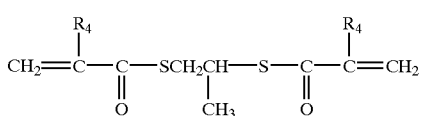

1,2-bis[(meth)acryloylthio]propane,

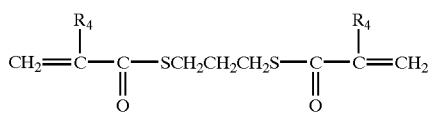

1,3-bis[(meth)acryloylthio]propane,

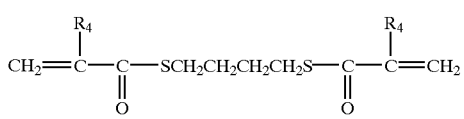

1,4-bis[(meth)acryloylthio]butane,

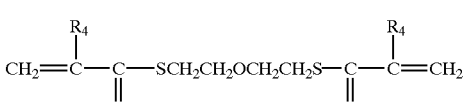

bis[2-(meth)acryloylthioethyl] ether,

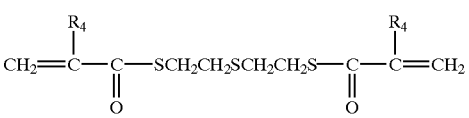

bis[2-(meth)acryloylthioethyl] sulphide (BMTES),

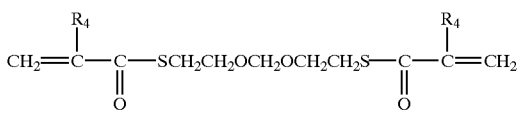

bis[2-(meth)acryloylthioethoxy]methane,

bis[2-(meth)acryloylthioethylthio]methane,

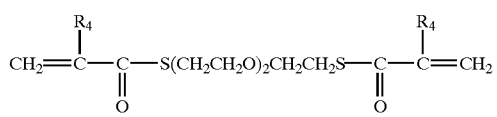

1,2-bis[2-(meth)acryloylthioethoxy]ethane,

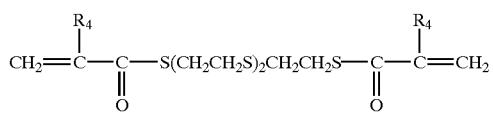

1,2-bis[2-(meth)acryloylthioethylthio]ethane,

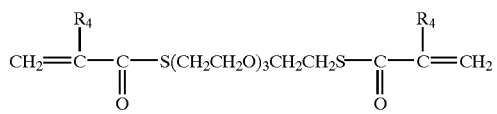

bis[2-(2-(meth)acryloylthioethoxy)ethyl] ether,

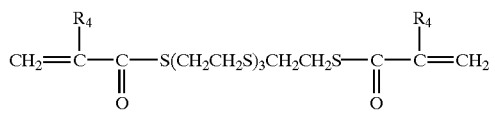

bis[2-(2-(meth)acryloylthioethylthio)ethyl] sulphide, in which $R_4$ is defined as above.

The particularly recommended compound (I) is BMTES.

The second monomer constituent of the mixture M is a compound of formula (II):

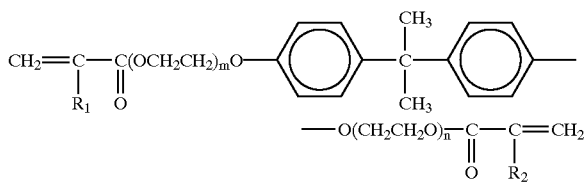

in which $R_1$ and $R_2$ represent, independently of one another, H or $CH_3$ and m+n has a mean value of 0 to 20 inclusive.

The compound (II) is preferably a mixture of fractions having a mean value of m+n of greater than or equal to 4.

These compounds (II) are well known in the art and can be obtained commercially.

The third polymerizable monomer constituent of the compositions according to the present invention is a polythiol of formula $R_5(SH)_n$, in which n is an integer of 2 or more, preferably 2 to 5, and $R_5$ is an aliphatic or aromatic radical.

The polythiol compound of the compositions of the invention is preferably a dithiol or trithiol compound or alternatively a polythiol with a high Abbe number.

These polythiol compounds are well known in the art and are disclosed, inter alia, in Document EP 394,495.

Mention may be made, among dithiols of use in the present invention, of 9,10-anthracenedimethane-thiol, 1,11-undecanedithiol, 4-ethylbenzene-1,3-dithiol, 1,2-ethanedithiol, 1,8-octanedithiol, 1,18-octadecanedithiol, 2,5-dichlorobenzene-1,3-dithiol, 1,3-(4-chlorophenyl)propane-2,2-dithiol, 1,1-cyclohexanedithiol, 1,2-cyclohexanedithiol, 1,4-cyclohexanedithiol, 1,1-cycloheptanedithiol, 1,1-cyclopentanedithiol, 4,8-dithiaundecane-1,11-dithiol, dithiopentaerythritol, dithiothreitol, 1,3-diphenylpropane-2,2-dithiol, 1,3-dihydroxy-2-propyl 2',3'-dimercaptopropyl ether, 2,3-dihydroxypropyl 2',3'-dimercaptopropyl ether, 2,6-dimethyloctane-2,6-dithiol, 2,6-dimethyloctane-3,7-dithiol, 2,4-dimethylbenzene-1,3-dithiol, 4,5-dimethylbenzene-1,3-dithiol, 3,3-dimethylbutane-2,2-dithiol, 2,2-dimethylpropane-1,3-dithiol, 1,3-di(4-methoxy-phenyl)propane-2,2-dithiol, 3,4-dimethoxybutane-1,2-dithiol, 10,11-dimercaptoundecanoic acid, 6,8-dimercaptooctanoic acid, 2,5-dimercapto-1,3,4-thia-diazole, 2,2'-dimercaptobiphenyl, 4,4'-dimercapto-biphenyl, 4,4'-dimercaptobibenzyl, 3,4-dimercapto-butanol, 3,4-dimercaptobutyl acetate, 2,3-dimercapto-1-propanol, 1,2-dimercapto-1,3-butanediol, 2,3-di-mercaptopropionic acid, 1,2-dimercaptopropyl methyl ether, 2,3-dimercaptopropyl 2',3'-dimethoxypropyl ether, 3,4-thiophenedithiol, 1,10-decanedithiol, 1,12-dodecanedithiol, 3,5,5-trimethylhexane-1,1-dithiol, 2,5-toluenedithiol, 3,4-toluenedithiol, 1,4-naphthalenedithiol, 1,5-naphthalenedithiol, 2,6-naphthalenedithiol, 1,9-nonanedithiol, norbornene-2,3-dithiol, bis(2-mercaptoisopropyl) ether, bis(11-mercaptoundecyl) sulphide, bis(2-mercaptoethyl) ether, bis(2-mercaptoethyl) sulphide, bis(18-mercapto-octadecyl) sulphide, bis(8-mercaptooctyl) sulphide, bis(12-mercaptodecyl) sulphide, bis(9-mercaptononyl) sulphide, bis(4-mercaptobutyl) sulphide, bis(3-mercaptopropyl) ether, bis(3-mercaptopropyl) sulphide, bis(6-mercaptohexyl) sulphide, bis(7-mercaptoheptyl) sulphide, bis(5-mercaptopentyl) sulphide, 2,2-bis(mercaptomethyl)acetic acid, 1,1-bis(mercaptomethyl)cyclohexane, bis(mercaptomethyl)durene, phenylmethane-1,1-dithiol, 1,2-butanedithiol, 1,4-butanedithiol, 2,3-butanedithiol, 2,2-butanedithiol, 1,2-propanedithiol, 1,3-propane-dithiol, 2,2-propanedithiol, 1,2-hexanedithiol, 1,6-hexanedithiol, 2,5-hexanedithiol, 1,7-heptane-dithiol, 2,6-heptanedithiol, 1,5-pentanedithiol, 2,4-pentanedithiol, 3,3-pentanedithiol, 7,8-hepta-decanedithiol, 1,2-benzenedithiol, 1,3-benzenedithiol, 1,4-benzenedithiol, 2-methylcyclohexane-1,1-dithiol, 2-methylbutane-2,3-dithiol, ethylene glycol dithio-glycolate or ethylene glycol bis(3-mercaptopropionate). Mention may be made, among trithiols, of 1,2,3-propanetrithiol, 1,2,4-butanetrithiol, trimethylolpropane trithioglycolate, trimethylolpropane tris(3-mercaptopropionate), pentaerythritol trithioglycolate, pentaerythritol tris(3-mercapto-propionate), 1,3,5-benzenetrithiol and 2,4,6-mesitylenetrithiol.

Mention may also be made, among polythiols of use in the compositions of the present invention, of neopentanetetrathiol, 2,2-bis(mercaptomethyl)-1,3-propanedithiol, pentaerythritol tetrakis(3-mercapto-propionate), 1,3,5-benzenetrithiol, 2,4,6-toluene-trithiol, 2,4,6-methylenetrithiol and polythiols corresponding to the formulae:

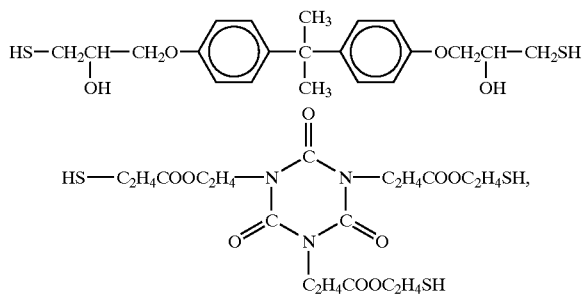

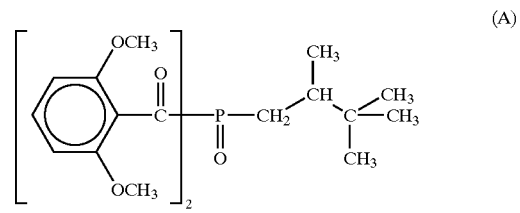

(A)

and of a compound of formula:

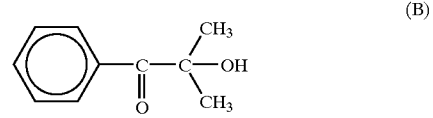

(B)

and the photoinitiator CGI 1850 sold by the Company Ciba-Geigy, which is a mixture (50/50) (by weight) of compound (A) and of Irgacure® 184 of formula:

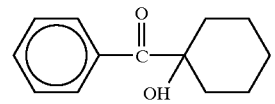

$(HSCH_2CH_2COOCH_2)_3CC_2H_5$ (TMTP), and 4-mercaptomethyl-3,6-dithia-1,8-octanedithiol.

The preferred polythiols according to the present invention are ethylene glycol bis(thioglycolate), trimethylolpropane tris(3-mercaptopropionate) and pentaerythritol tetrakis (3-mercaptopropionate).

As indicated above, the polymerizable composition according to the invention comprises 3 to 30% by weight of polythiol with respect to the total weight of the mixture M. The polythiol is preferably used at a concentration of 5 to 20% by weight, better still of greater than 7% by weight and even better still generally of between 10 and 15% by weight.

The polymerizable compositions according to the invention can also comprise additives conventionally used in polymerizable compositions for the moulding of optical articles, in particular spectacle glasses, in conventional proportions, namely inhibitors, colorants, UV absorbers, fragrances, deodorants, antioxidants and anti-yellowing additives.

Mention may be made, as preferred examples of antioxidizing agents, of triphenylphosphine (TPP) and Irganox® 1010 (pentaerythritol tetrakis[3-(3,5-di-tert-butyl-4-hydroxyphenyl)propionate]) (CG1010).

Fragrances make it possible to mask the odour of the compositions, in particular during surface working operations.

The compositions according to the invention generally comprise polymerization initiators, preferably photoinitiators or mixtures of photo-initiators and of thermal initiators, in a proportion of 0.001 to 5% by weight with respect to the total weight of polymerizable monomers present in the composition.

Mention may in particular be made, among photoinitiators which can be used in the polymerizable compositions according to the invention, of 2,4,6-trimethylbenzoyldiphenylphosphine oxide, 1-hydroxycyclohexyl phenyl ketone, 2,2-dimethoxy-1,2-diphenylethan-1-one, alkylbenzoyl ethers, the photoinitiator sold by the Company Ciba-Geigy under the name CGI 1700, which is a 25/75 mixture of a compound of formula:

As indicated above, the preferred polymerizable compositions according to the invention are photopolymerizable compositions comprising one or more photoinitiators.

More preferably, the polymerizable compositions according to the invention are photo- and thermo-polymerizable compositions comprising both a polymerization photoinitiator and a polymerization thermal initiator.

In particular, it has been found that, when the concentration of polythiol in the polymerizable composition according to the invention is of the order of approximately 10% by weight or more with respect to the total weight of the mixture M, it is preferable to carry out an initial photopolymerization for a period preferably varying from 1 to 5 minutes and then to subject the composition to a thermal polymerization at a temperature of generally between 60 and 130° C. for a period of approximately 1 to 2 hours.

Thermal polymerization initiators are compounds which are well known in the art and mention may be made, among them, of peroxides, such as benzoyl peroxide, cyclohexyl peroxydicarbonate or isopropyl peroxydicarbonate.

In the following examples illustrating the present invention, all the parts and percentages, except when otherwise indicated, are expressed by weight.

In these examples, the following abbreviations were used:

BMTES: bis[2-(methacryloylthio)ethyl] sulphide;

80 N: BPE-80N monomer, sold by the company Shin Nakamura, of formula:

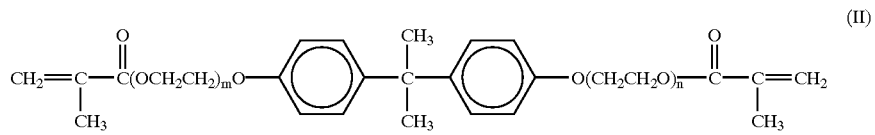

(II)

in which the mean value of m+n=2.6;

200 N: BPE-200N monomer from Shin Nakamura of formula (II) in which m+n has a mean value of 4.2;

D 121: monomer of formula (II) in which m+n has a mean value 4.8, supplied by the company Akzo;

EGTG: ethylene glycol bis(thioglycolate);

TMTP: trimethylolpropane tris(3-mercapto-propionate);

PETP: pentaerythritol tetrakis(3-mercapto-propionate);

TPP: triphenylphosphine;

UV 5411: 2-(2-hydroxy-5-(t-octyl)phenyl)benzotriazole (UV absorber);

CGI 1700: photoinitiator from the company Ciba-Geigy comprising the two compounds:

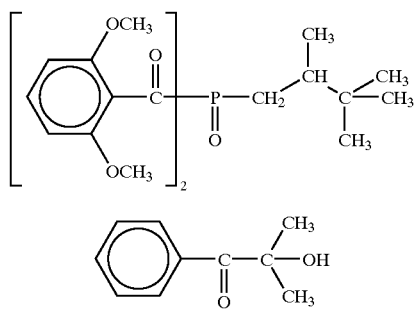

with a ratio B/A 75/25.

The yellowing indices of the polymers obtained by moulding and polymerization of the compositions of the examples were determined by the spectroscopic route. For this spectroscopic route, use is made of a normalized method (ASTM D-1925-63) in which the yellowing index is defined by:

$$Yi = \frac{(127.5\,X - 105.8\,Z)}{Y},$$

where X, Y and Z are the trichromatic coordinates of the sample, measured with a UV/visible spectrophotometer over the entire spectrum between 380 and 780 nm. The Yi value is given before and after annealing the polymers.

The higher the Yi value, the higher the yellowing index.

EXAMPLES 1 TO 7

The polymerizable mixtures 1 to 7, the compositions of which are shown in Table I below, were prepared.

Each of the mixtures is poured into a mould made of inorganic glass for ophthalmic lenses and then the moulds, thus filled, are exposed to UV irradiation for 2 to 3 minutes. After removing from the moulds, the polymers obtained are subjected to annealing at 120° C. for 2 hours.

The yellowing index (Yi) measurements are carried out on an ophthalmic lens with a thickness of 16 mm at the centre before and after annealing.

The results of the yellowing index measurements, as well as the refractive indices, Abbe number, colouring (percent of transmission) and relative density, of the polymers are given in Table I below.

TABLE I

| | EXAMPLES | | | | | | |
|---|---|---|---|---|---|---|---|
| | 1 | 2 | 3 | 4 | 5 | 6 | 7 |
| Polymerizable monomers | Parts by weight | | | | | | |
| Mixture M | | | | | | | |
| BMTES | 40 | 40 | 40 | 40 | 45 | 50 | 50 |
| D 121 | — | — | — | 60 | — | — | — |
| 80 N | — | — | 25 | — | — | — | — |
| 200 N | 60 | 60 | 30 | — | 55 | 35 | 35 |
| Polythiol | | | | | | | |
| EGTG | 7.5 | 10 | 5 | 7.5 | 6 | — | — |
| TMTP | — | — | — | — | — | 15 | — |
| PETP | — | — | — | — | — | — | 15 |
| Adjuvants | Percent by weight with respect to the polymerizable monomers | | | | | | |
| CGI 1700 (photoinitiator) | 0.10 | 0.10 | 0.10 | 0.10 | 0.10 | 0.10 | 0.10 |
| TPP (lightening agent) | 0.10 | 0.10 | 0.10 | 0.10 | 0.10 | 0.10 | 0.10 |
| UV 5411 (UV absorber) | 0.05 | 0.05 | 0.05 | 0.05 | 0.05 | 0.05 | 0.05 |
| Transmission (%) (at 550 nm) | 90.32 | 90.1 | 90.24 | 90.67 | 90 | 90 | 90 |
| Scattering | NO | NO | NO | NO | NO | NO | NO |
| Yi (lens thickness 16 mm) | | | | | | | |
| before annealing | 1.73 | 1.41 | 2.24 | 2.61 | — | — | — |
| after annealing | 1.66 | 1.51 | 2.31 | 2.51 | 2.4 | 2.7 | 2.8 |
| Chemical resistance | — | — | — | — | YES | YES | YES |
| Index | — | — | — | — | 1.585 | 1.589 | 1.588 |
| Abbe number | — | — | — | — | 38 | 36 | 36 |
| Colouring (% of transmission) | — | — | — | — | 36 | 35 | 38 |
| Relative density | — | — | — | — | 1.26 | 1.27 | 1.28 |

Example 8 and Comparative Example CE 1

The mixtures shown in Table II below are prepared in the same way as above. However, for the implementation of Comparative Example CE 1, it is necessary to warm the mixture of monomers to approximately 45° C. in order to ensure good homogenization of the mixture before introduction into the moulds.

The results for the yellowing index before and after annealing, for visible scattering and for haze are given in Table II below.

The lenses exhibit a thickness at the centre of 16 mm.

TABLE II

| | Example 8 | CE 1 |
|---|---|---|
| Polymerizable monomers | Parts by weight | |
| BMTES | 40 | |
| BMTPS | | 40 |
| 200 N | 50 | 50 |
| EGTG | 10 | 10 |
| Adjuvants | % by weight with respect to the total weight of monomers | |
| UV 5411 | 0.05 | 0.05 |
| Irganox ® 1010 (antioxidizing agent) | 0.10 | 0.10 |
| TPO (photoinitiator) | 0.07 | 0.07 |
| Irgacure ® 184 (photoinitiator) | 0.03 | 0.03 |

TABLE II-continued

|  | Example 8 | CE 1 |
|---|---|---|
| Transmission | 91.7 | 90 |
| Yi before annealing | 4.7 | 11.72 |
| Yi after annealing | 4.4 | 11 |
| Visible scattering | NO | YES |
| Haze | 1.7 | 3.2 |

TPO = (2,4,6-trimethylbenzoyl)diphenylphosphine.

Comparative Example CE 2

A composition according to the teaching of Example 11 of French Patent Application No. 9506443 of Essilor, published under No. FR 2,734,828, is reproduced.

| Composition: | |
|---|---|
| Polymerizable monomers | Parts by weight |
| BMTES | 21 |
| BMTPS | 10 |
| EBADMA | 24 |
| OBADMA | 28 |
| TBrBA | 11 |
| TMTP | 6 |
| Adjuvants | % by weight with respect to the total weight of inonorners |
| UV 5411 | 0.05 |
| Irganox ® 1010 | 0.10 |
| TPO | 0.07 |
| Irgacure ® 184 | 0.035 |

EBADMA: monomer of formula (II) with $R_1 = CH_3$, $R_2 = CH_3$, m + n = 2.6
OBADMA: monomer of formula (II) with $R_1 = CH_3$, $R_2 = CH_3$, $R_2 = CH_3$, m + n = 10
TBrBa: tribromobenzyl acrylate
Irgacure ® 184: 1-hydroxycyclohexyl phenyl ketone
TPO: (2,4,6-trimethylbenzoyl)diphenyl-phosphine After photopolymerization in moulds and annealing as for Examples 1 to 7, an ophthalmic lens with a centre thickness of 16 mm is obtained.

The Yi values measured are:

before annealing: 5.83 after annealing: 6.08.

A test of rapid ageing by exposure to sunlight is carried out on the lenses obtained. This test of exposure to sunlight consisted in subjecting the lenses for 100 and 200 hours to exposure to sunlight under the same conditions with a Suntest Hanau device emitting radiation with a power of 24.4 W/m² in the 300–400 nm spectral region.

The yellowing index of the polymers was measured after exposure to sunlight for 100 hours and 200 hours. After 100 hours of exposure to the test of exposure to sunlight, the yellowing index Yi=6.57 and, after 200 hours, Yi=19.56.

Example 9

In comparison, a lens according to the invention, prepared under the same conditions as Comparative Example CE 2 with the following polymerizable mixture:

| Polymerizable monomers | Parts by weight |
|---|---|
| BMTES | 50 |
| DBADMA | 50 |
| TMTP | 6.4 |
| Adjuvants | % by weight with respect to the total weight of ionomers |
| UV 5411 | 0.05 |
| CG 1010 | 0.10 |
| TPO | 0.07 |
| Irgacure ® 184 | 0.035 | exhibits, after exposure to sunlight for 200 hours, a yellowing index Yi of 4.67.

DBADMA, compound of formula (II) with $R_1$ and $R_2=CH_3$ and m+n=4.

Examples 10 and 11

The following compositions of Table III are prepared and are cast in moulds.

The polymerization conditions are shown below.

TABLE III

|  | Example 10 | Example 11 |
|---|---|---|
| Polymerizable monomers | Parts by weight | |
| BMTES | 50 | 54 |
| D 121 | 35 | 40 |
| PETG | 15 | |
| TMTP |  | 6 |
| Adjuvants | % by weight with respect to the total weight of monomers | |
| UV 5411 | 0.10 | 0.10 |
| CG 1010 | 0.10 | 0.10 |
| TPO | 0.07 | 0.07 |
| CGI 184 | 0.03 | 0.03 |
| t-Butyl peroxy(2-ethylhexanoate) (thermal initiator) | 0.10 | 0.10 |
| Polymerization | UV | UV |
|  | 2 minutes then heating for 1–2 hours at 60–120° C. | 3 minutes |
| Properties | | |
| ne/nd | 1.599/1.594 | 1.598/1.593 |
| Abbe number ve/vd | 39/38.7 | 37.7/37.4 |
| Yi (1.3 mm) | 1.5 | 1.48 |
| Relative density | 1.285 | 1.27 |

PETG: pentaerythritol tetrakis(thioglycolate)

The lenses exhibit a thickness at the centre of 16 mm.

The test of chemical resistance was carried out by immersing the lenses in 95% ethanol for 120 minutes; in acetone for 3, 15 and 30 minutes; in 3% acetic acid for 30 minutes; in 10% sodium hydroxide solution at 50° C. for 5 and 15 minutes; and in saline water (45 g/l) for 8, 24 and 48 hours. The lenses are subsequently tested visually under a fluorescent lamp.

The test is positive (Chemical resistance: yes) if the lenses do not exhibit any visual defect. The test is negative in the contrary case.

The haze was measured by means of a Hazeguard® device. The value of the haze is read directly from the device. The lower the value read, the lower the scattering.

The scattering was measured visually by placing the lens under a fluorescent lamp and by visually observing if there exist scattering microdomains in the lens. The absence of scattering microdomains visible to the naked eye is identified by a "NO"". The existence of such microdomains is identified by a "YES".

What is claimed is:

1. A polymerizable composition comprising base copolymerizable monomer constituents that comprise at least 85% by weight, with respect to the total weight of copolymerizable monomers present in the composition comprising:
   (a) a mixture M consisting, per 100 parts by weight of the mixture, of:
      (i) 20 to 80 parts of one or more nonaromatic compounds (I), of formula:

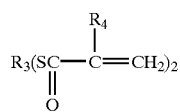

in which $R_3$ represents a linear or branched divalent aliphatic hydrocarbonaceous radical and $R_4$ represents a hydrogen atom or a $CH_3$ group and (ii) 80 to 20 parts of a compound (II) of formula:

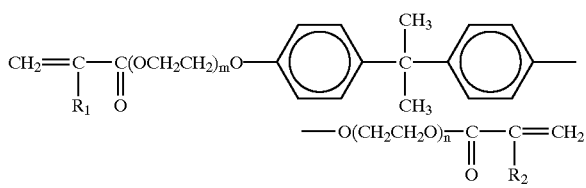

in which $R_1$ and $R_2$ represent, independently of one another, H or $CH_3$ and m+n has a mean value of 0 to 20 inclusive; and (b) 3 to 30% by weight, with respect to the weight of the mixture M, of a polythiol; the composition comprising less than 5% by weight, with respect to the total weight of the copolymerizable monomers present in the composition, of an aromatic compound selected from the group consisting of aromatic thio(meth)acrylate monomers, aromatic or cyclanic mono(meth)acrylate monomers, and aromatic vinyl monomers.

2. The composition of claim 1, further defined as comprising base monomer constituents representing 90% of the copolymerizable monomers present in the composition.

3. The composition of claim 2, further defined as comprising base monomer constituents representing 95% of the copolymerizable monomers present in the composition.

4. The composition of claim 3, further defined as comprising base monomer constituents representing 98% of the/copolymerizable monomers present in the composition.

5. The composition of claim 4, further defined as comprising the base monomer constituents representing 100% of the copolymerizable monomers present in the composition.

6. The composition of claim 1, wherein compound (I) is bis(2-(meth)acryloylthioethyl) sulphide.

7. The composition of claim 1, wherein compound (II) is a mixture of fractions having a mean value of m+n of greater than or equal to 4.

8. The composition of claim 1, wherein the polythiol is a dithiol, a trithiol or a polythiol with a high Abbe number.

9. The composition of claim 1, wherein the polythiol is present at a concentration ranging from 5 to 20% by weight with respect to the total weight of the mixture M.

10. The composition of claim 9, wherein the polythiol is present at a concentration of greater than 7% by weight with respect to the total weight of the mixture M.

11. The composition of claim 9, wherein the polythiol is present at a concentration of between 10 and 15% by weight with respect to the total weight of the mixture M.

12. The composition of claim 1, wherein the composition is a photopolymerizable composition.

13. A polymer produced by polymerization of a composition comprising base copolymerizable monomer constituents that comprise at least 85% by weight, with respect to the total weight of copolymerizable monomers present in the composition comprising:
   (a) a mixture M consisting, per 100 parts by weight of the mixture, of:
      (i) 20 to 80 parts of one or more nonaromatic compounds (I) of formula:

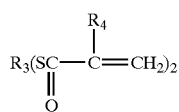

in which $R_3$ represents a linear or branched divalent aliphatic hydrocarbonaceous radical and $R_4$ represents a hydrogen atom or a $CH_3$ group; and (ii) 80 to 20 parts of a compound (II) of formula:

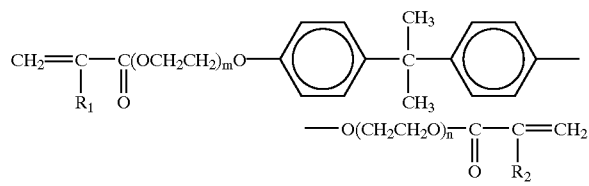

in which $R_1$ and $R_2$ represent, independently of one another, H or $CH_3$ and m+n has a mean value of 0 to 20 inclusive; and (b) 3 to 30% by weight, with respect to the weight of the mixture M, of a polythiol; the composition comprising less than 5% by weight, with respect to the total weight of the copolymerizable monomers present in the composition, of an aromatic compound selected from the group consisting of aromatic thio(meth)acrylate monomers, aromatic or cyclanic mono(meth)acrylate monomers, and aromatic vinyl monomers.

14. An optical lens composed of a polymer produced by the polymerization of a composition, comprising a polymerizable composition comprising base copolymerizable monomer constituents that comprise at least 85% by weight, with respect to the total weight of copolymerizable monomers present in the composition comprising:
   (a) a mixture M consisting, per 100 parts by weight of the mixture, of:
      (i) 20 to 80 parts of one or more nonaromatic compounds (I) of formula

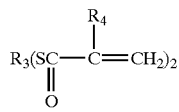

in which $R_3$ represents a linear or branched divalent aliphatic hydrocarbonaceous radical and $R_4$ represents a hydrogen atom or a $CH_3$ group; and (ii) 80 to 20 parts of a compound (II) of formula:

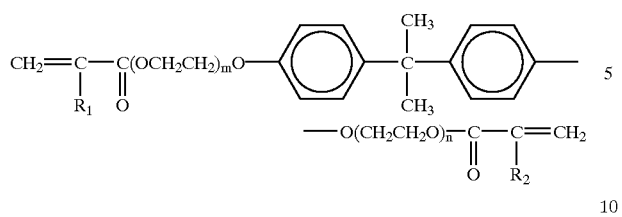

in which $R_1$ and $R_2$ represent, independently of one another, H or $CH_3$ and m+n has a mean value of 0 to 20 inclusive; and (b) 3 to 30% by weight, with respect to the weight of the mixture M, of a polythiol; the composition comprising less than 5% by weight, with respect to the total weight of the copolymerizable monomers present in the composition, of an aromatic compound selected from the group consisting of aromatic thio(meth)acrylate monomers, aromatic or cyclanic mono(meth)acrylate monomers, and aromatic vinyl monomers.

15. The optical lens according to claim 14, wherein the lens is a spectacle glass.

16. The polymerizable composition of claim 1, wherein the linear or branched divalent aliphatic hydrocarbonaceous radical is further defined as comprising in its chain, one or more divalent groups chosen from the group consisting of:

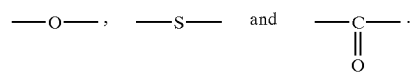

17. The polymer composition of claim 13, wherein the linear or branched divalent aliphatic hydrocarbonaceous radical is further defined as comprising in its chain, one or more divalent groups chosen from the group consisting of:

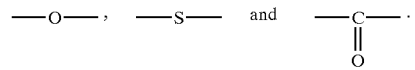

18. The optical lens of claim 14, wherein the linear or branched divalent aliphatic hydrocarbonaceous radical is further defined as comprising in its chain, one or more divalent groups chosen from the group consisting of:

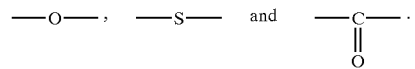

* * * * *

UNITED STATES PATENT AND TRADEMARK OFFICE
CERTIFICATE OF CORRECTION

PATENT NO. : 6,635,730 B1
DATED : October 21, 2003
INVENTOR(S) : Jiang et al.

It is certified that error appears in the above-identified patent and that said Letters Patent is hereby corrected as shown below:

<u>Title page,</u>
Item [57], ABSTRACT, delete

"The invention concerns novel polymerisable compositions and optical lenses with high refractive index obtained from said compositions, characterized in that they comprise as constituents base copolymerisable monomers at least 85 wt. % of the total weight of copolymerisable monomers present in the composition: of a mixture M, for 100 parts by weight of the mixture; of (A) 20 to 80 parts of one or several, preferably only one, non-aromatic compounds (I) comprising two thio(meth)acrylate functions, and (B) 80 to 20 parts of a compound of formula (I) in which $R_1$ and $R_2$ represent, independently of each other, H or $CH_3$ and m+n has a mean value from 0 to 20 inclusively; and 3 to 30% by weight relative to the weight of mixture M of a polythiol; the composition containing less than 5 wt. % of other aromatic thio(meth)acrylate copolymerisable, cyclanic or vinyl aromatic mono(meth)acrylate monomers. The invention is applicable to the manufacture of spectacle lenses."

and insert

-- The present invention provides polymerizable thioacrylate compositions comprising base coploymerizable monomer constituents, polymers produced by polymerizable thioacrylate compositions, and optical lens.--

<u>Column 16,</u>
Line 7, delete "composition".

Signed and Sealed this

Second Day of March, 2004

JON W. DUDAS
*Acting Director of the United States Patent and Trademark Office*